UNITED STATES PATENT OFFICE.

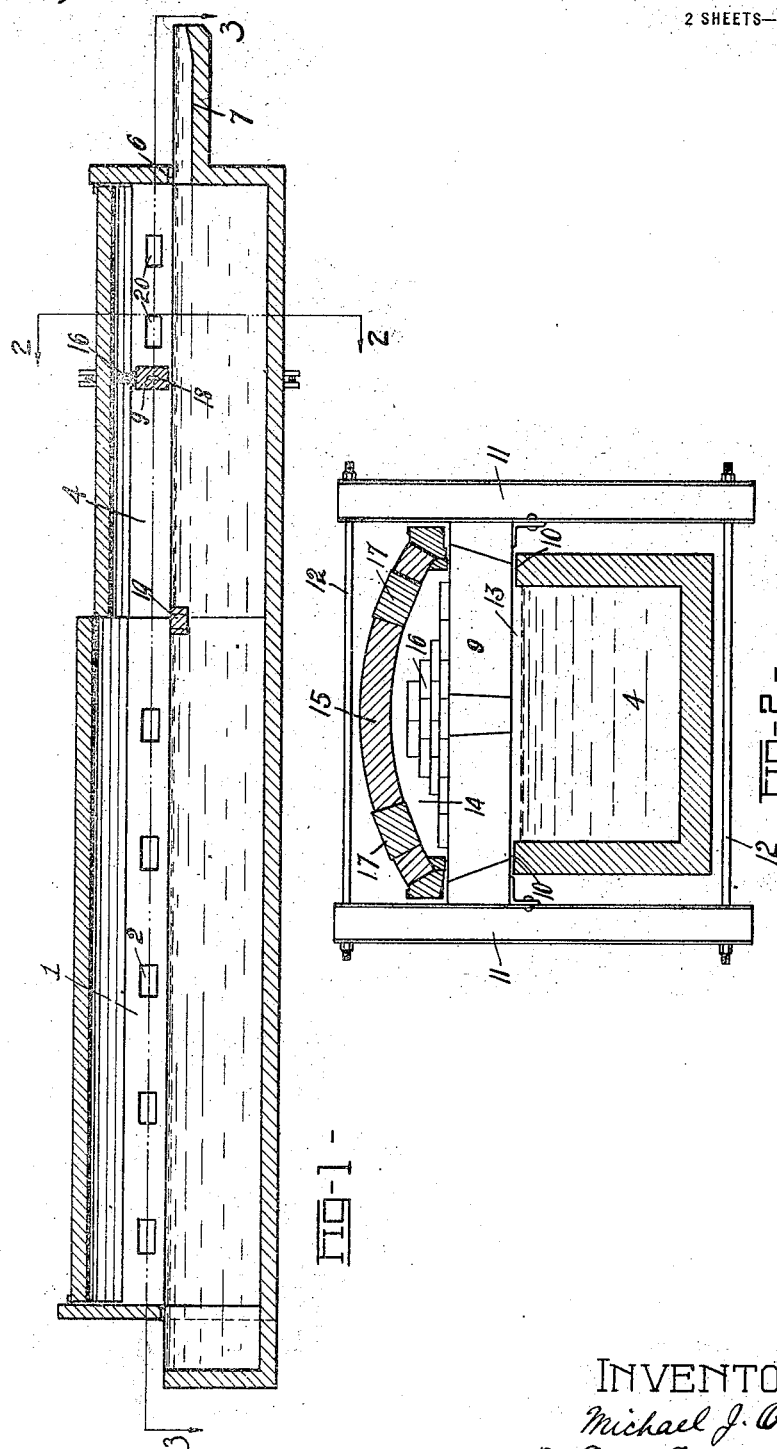

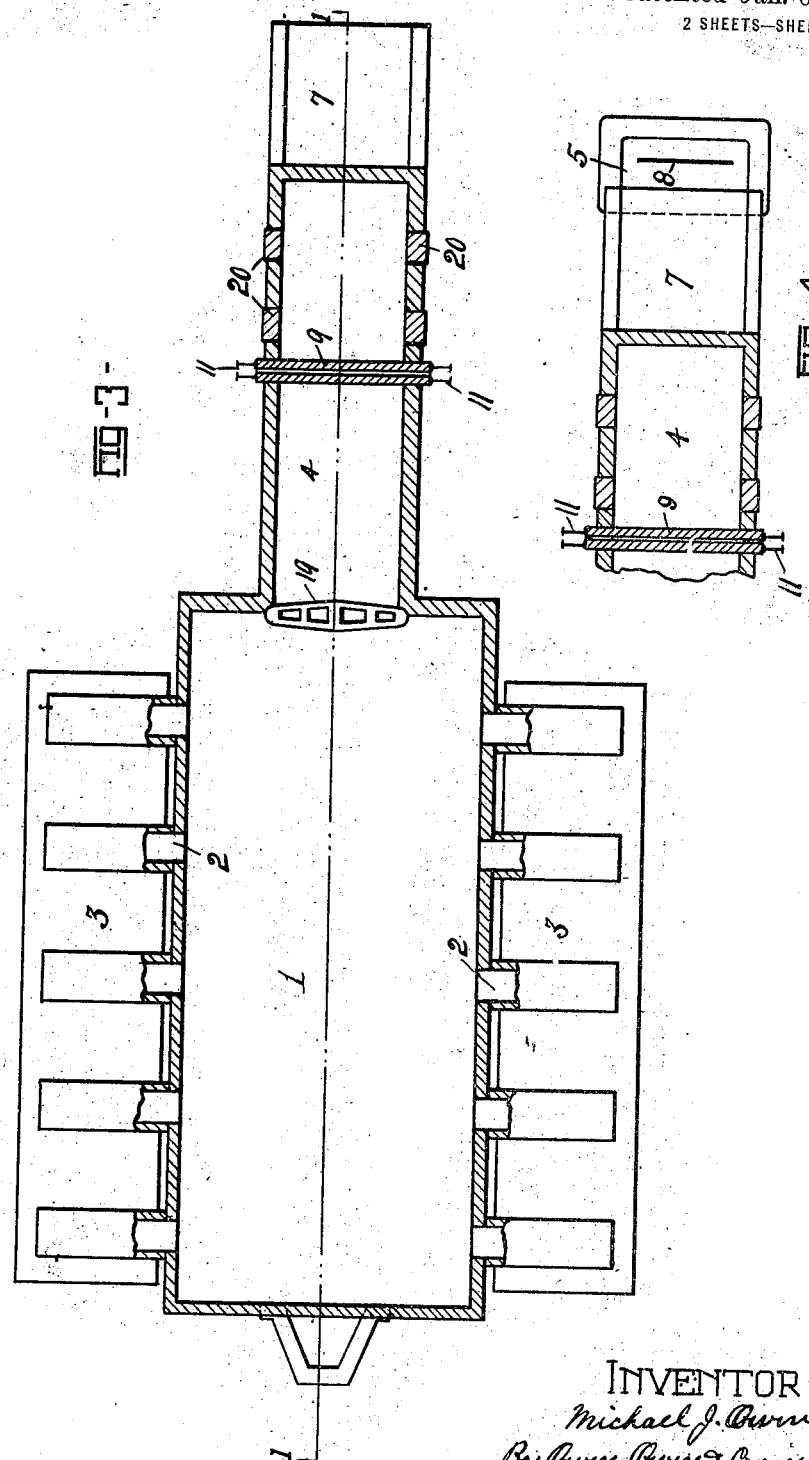

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

FURNACE FOR CONTINUOUS SHEET-GLASS DRAWING.

1,327,405.     Specification of Letters Patent.     Patented Jan. 6, 1920.

Application filed November 18, 1918. Serial No. 263,024.

*To all whom it may concern:*

Be it known that I, MICHAEL J. OWENS, a citizen of the United States, and a resident of Toledo, in the county of Lucas and State of Ohio, have invented a certain new and useful Furnace for Continuous Sheet-Glass Drawing; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the glass working art, and particularly to the manufacture of sheet glass.

The object of the invention is the provision of simple and efficient means in the refining chamber of a glass melting furnace to retard or regulate the passage through such chamber of the hot gases from the melting chamber of the furnace, whereby a more efficient partial cooling of the surface portion of the molten glass within the outer or drawing-off end of the refining chamber may be accomplished to render the glass in a more ideal condition for drawing, and whereby the temperature within said end of the refining chamber may be easily and effectively regulated to suit the thickness of the sheet being drawn, it being found in practice that glass should run cooler at the drawing point when drawing a thick sheet than when drawing a thin sheet.

In the continuous drawing of sheet glass, it is found that the quality of the sheet drawn depends largely on the temperature of the glass at the point of drawing from the pot and that the temperature of the mass in the pot should be uniform throughout the width of the sheet. In the furnaces heretofore employed in connection with the continuous drawing of sheet glass, it has been customary so far as I am aware, to have the refining tank through which the molten glass flows from the melting tank to the point of drawing, of a width which is as great or greater than the width of the melting tank and of a considerably greater width than the sheet being drawn. The stream of glass flowing through the refining tank to the point of drawing necessarily confines itself in width to approximately the width of the sheet being drawn, thereby causing the glass disposed at the sides of the flowing stream within the refining tank to assume a sluggish and consequently cooler condition to the detriment of the temperature of the glass at the respective edge portions of the flowing stream. It is therefore evident that the sheet being drawn will be of unequal temperature throughout its width at the point of draw so that unequal and injurious stresses are set up within the sheet.

An object of my invention is to overcome this objection in connection with continuous sheet glass drawing furnaces and to thereby obtain a sheet which is more uniformly perfect and of greater commercial value.

The invention is fully described in the following specification, and while, in its broader aspect, it is capable of embodiment in numerous forms, a preferred embodiment thereof is illustrated in the accompanying drawings, in which,—

Figure 1 is a central vertical longitudinal section of a glass melting furnace and refining tank embodying my invention. Fig. 2 is an enlarged cross-section on the line 2—2 in Fig. 1. Fig. 3 is a section on the line 3—3 in Fig. 1, with the associated regenerative chambers shown partly in full, and Fig. 4 is a horizontal section of the outer end portion of the refining tank associated with a drawing pot and with a sheet of glass being drawn from the pot.

Referring to the drawings, 1 designates the customary melting tank or chamber of a glass furnace, the heat or gas flues 2 thereof, in the present instance, being located in the upper portion of the furnace side walls and leading from regenerative chambers 3, as is well understood in the art. The molten glass flows from the outlet end of the melting tank through a refining tank or chamber 4 extending adjacent to the point of drawing of a sheet and being preferably, but not necessarily, substantially equal to the melting tank in depth and of a width which is slightly greater than the width of a sheet being drawn. In practice it is found that excellent results are obtained by making the refining tank 4 approximately 8 feet in width when the sheet being drawn is approximately 6 feet in width. It will be understood, however, that these dimensions are merely illustrative and not intended to limit the scope of the invention, as the relative width of the refining tank and sheet may be varied from those stated without departing from the invention. It is preferable to make the width of the melting tank greater than that of the refining tank, as shown.

It is found in practice that by making the width of the refining tank substantially the same or only slightly greater than that of the sheet being drawn creates a more active current through the tank to replace the glass drawn in continuous sheet form from the associated drawing pot 5, prevents a sluggish condition being present at the sides of the glass stream, and brings about a more perfect and uniform temperature condition throughout the width of the sheet being drawn than is possible if the refining tank is considerably wider than the drawn sheet.

The refining tank 4 in its outer end is provided with an outlet opening 6 through which the surface portion of the stream flows in relatively thin or shallow form onto and over a longitudinally extending cooling chamber or trough 7 and therefrom into the drawing pot 5 from which the glass is continuously drawn in the form of a sheet 8, as is well understood in the art.

The refining tank 4 is provided intermediate its ends above the surface of the glass with a suspended jack-arch or heat retarding gate or valve member 9, which extends crosswise of the tank and is intended to control the passage of the furnace or melting chamber heat to the portion of the refining tank in advance of the arch. The arch 9, in the present instance, extends through openings 10 in the tank sides and is supported at its ends without the tank by upright beams or standards 11, 11 tied together at top and bottom by rods 12. In the illustrated embodiment of the invention the arch 9 is adapted to provide a narrow space 13 of constant size between it and the glass surface and provides an opening 14 between its top and the roof-arch 15 of the tank, which space is varied in size by placing one or more rows of fire brick 16 or other heat obstructing means therein on the arch top. Access to the top of the jack-arch 9 for the purpose of depositing the brick 16 thereon or removing them therefrom is had through openings in the roof-arch, which openings, when not in use, are closed by blocks or other suitable closure members 17. A passage 18 is provided lengthwise through the central portion of the jack-arch 9, and air under pressure is forced therethrough by any suitable means (not shown) to effect a cooling of the arch.

19 designates a float which is located across or adjacent to the mouth or inlet end of the refining tank 4 and serves to prevent blocks or other refuse matter floating on the glass in the melting tank from passing through the refining tank to the drawing point. Removable blocks 20 are mounted in and close openings in the side walls of the refining tank in advance of the jack-arch. Said openings are provided for the insertion of burners to facilitate the initial raising of the temperature of the glass in the forward end of the refining tank when starting a run.

The provision of the jack-arch 9 or other suitable means within the refining tank to retard or restrict the flow of the highly heated gases in the melting tank through the refining tank to the forward end thereof is found to be exceedingly beneficial to the continuous drawing of a perfect sheet of glass from the drawing pot into which the melted glass flows from the refining tank, as experiments have demonstrated that it is important to reduce the temperature of the surface of the molten glass in the forward drawing off end of the refining tank below the temperature of the glass in the melting tank and the inner end portion of the refining tank, as otherwise the consistency of the glass is not sufficient to permit a satisfactory drawing of the same in sheet form. It is also found that the temperature of the glass in the forward end portion of the refining tank should be varied to suit the thickness of the sheet being drawn, as glass of cooler temperature is required when drawing a thick sheet than when drawing a thin sheet. A regulation of the temperature in the forward end portion of the refining chamber to suit the drawing conditions and the thickness of the sheet being drawn is accomplished by varying the size of the space between the jack-arch and the roof-arch of the refining tank by the placing of blocks 16 on the jack-arch in said space, or by the provision of any other suitable means for the purpose.

I wish it understood that my invention is not limited to any specific construction, arrangement or form of the parts as it is capable of numerous modifications and changes without departing from the spirit of the claims.

Having thus described my invention, what I claim as new, and desire to secure by Letters Patent, is,

1. In combination, a glass melting tank, a refining tank leading therefrom through which molten glass flows from the melting tank toward a sheet drawing source, and regulable means in the refining tank for retarding the flow of hot gases from the melting tank to the outlet end portion of the refining tank over the molten glass therein.

2. In combination, a glass melting furnace, a refining tank leading therefrom through which molten glass flows from the melting tank toward a sheet drawing source, and regulable means disposed crosswise of the refining tank above the glass therein for restricting to a predetermined extent the flow of hot gases from the melting tank to the portion of the refining tank in advance of said means.

3. In combination, a glass melting furnace, a refining tank leading therefrom through which molten glass flows from the melting tank toward a sheet drawing source, and a jack-arch disposed across the interior of the refining chamber above the molten glass therein for retarding to a predetermined extent the flow of hot gases from the melting tank to the portion of the refining tank in advance of said arch.

4. In combination, a glass melting furnace, a refining tank leading therefrom through which molten glass flows from the melting tank toward a sheet drawing source, and a jack-arch disposed across the interior of the refining chamber above the molten glass therein for retarding to a predetermined extent the flow of hot gases from the melting tank to the portion of the refining tank in advance of said arch.

5. In combination, a glass melting furnace, a refining tank leading therefrom through which molten glass flows from the melting tank toward a sheet drawing source, a jack-arch disposed across the interior of the refining chamber above the molten glass therein for retarding to a predetermined extent the flow of hot gases from the melting tank to the portion of the refining tank in advance of said arch, and supporting means without the refining tank for said arch.

6. In combination, a glass melting furnace, a refining tank leading therefrom through which molten glass flows from the melting tank toward a sheet drawing source, and a jack-arch disposed across the interior of the refining chamber above the molten glass therein for retarding to a predetermined extent the flow of hot gases from the melting tank to the portion of the refining tank in advance of said arch, the jack-arch having an air passage lengthwise therethrough opening without the refining tank.

7. In combination, a glass melting furnace, a refining tank leading therefrom through which molten glass flows from the melting tank toward a sheet drawing source, and a jack-arch disposed across the interior of the refining chamber above the molten glass therein for retarding to a predetermined extent the flow of hot gases from the melting tank to the portion of the refining tank in advance of said arch, the jack-arch having an air circulating passage lengthwise therethrough.

8. In combination, a glass melting furnace, a refining tank leading therefrom through which molten glass flows from the melting tank toward a sheet drawing source, and a jack-arch disposed across the interior of the refining chamber above the molten glass therein in spaced relation to the refining tank roof for retarding to a predetermined extent the flow of hot gases from the melting tank to the portion of the refining tank in advance of said means.

9. In combination, a glass melting furnace, a refining tank leading therefrom through which molten glass flows from the melting tank toward a sheet drawing source, and a suspended jack-arch disposed across the interior of the refining tank above the molten glass therein in spaced relation to the refining tank roof for retarding to a predetermined extent the flow of hot gases from the melting tank to the portion of the refining tank in advance of said means.

10. In combination, a glass melting furnace, a refining tank leading therefrom through which molten glass flows from the melting tank toward a sheet drawing source, a jack-arch disposed across the interior of the refining chamber above the molten glass therein in spaced relation to the refining tank roof for retarding to a predetermined extent the flow of hot gases from the melting tank to the portion of the refining tank in advance of said means, and regulable means on said jack-arch for varying the size of the space between the arch and roof.

11. In combination, a glass melting furnace, a refining tank leading therefrom through which molten glass flows from the melting tank toward a sheet drawing source, a jack-arch disposed across the interior of the refining chamber above the molten glass therein for retarding to a predetermined extent the flow of hot gases from the melting tank to the portion of the refining tank in advance of said means, said arch being spaced from the roof of the refining tank, means independent of the refining tank walls supporting said arch, and regulable means on the jack-arch for varying the size of the space between the arch and roof.

In testimony whereof, I have hereunto signed my name to this specification.

MICHAEL J. OWENS.